United States Defensive Publication [19] (H) [11] T 106801

Mair [43] Jul. 1, 1986

[54] METHOD TO IMPROVE ACIDULATION QUALITY OF IDAHO PHOSPHATE ROCK

[76] Inventor: Alexander D. Mair, Rte. 7, Box 143, Florence, Ala. 35630

[21] Appl. No.: 710,772

[22] Filed: Mar. 11, 1985

[51] Int. Cl.[4] ..... C01F 11/46

[52] U.S. Cl. ..... 423/167

[57] ABSTRACT

Phosphate rock, containing appreciable quantities of organic impurities, is thermally treated under controlled conditions to fully utilize the fuel values of the organic matter contained therein. This process is beneficial for treating deposits of unaltered Idaho rock containing both higher grade phosphate rock and lower grade phosphatic shales and recovering therefrom substantially all the phosphate values as a rock product rendered more acceptable for acidulation to wet-process phosphoric acid.

3 Claims, 1 Sheet Drawing,

29 Pages Specification

The file of this unexamined application may be inspected and copies thereof may be purchased (849 O.G. 1221, Apr. 9, 1968).

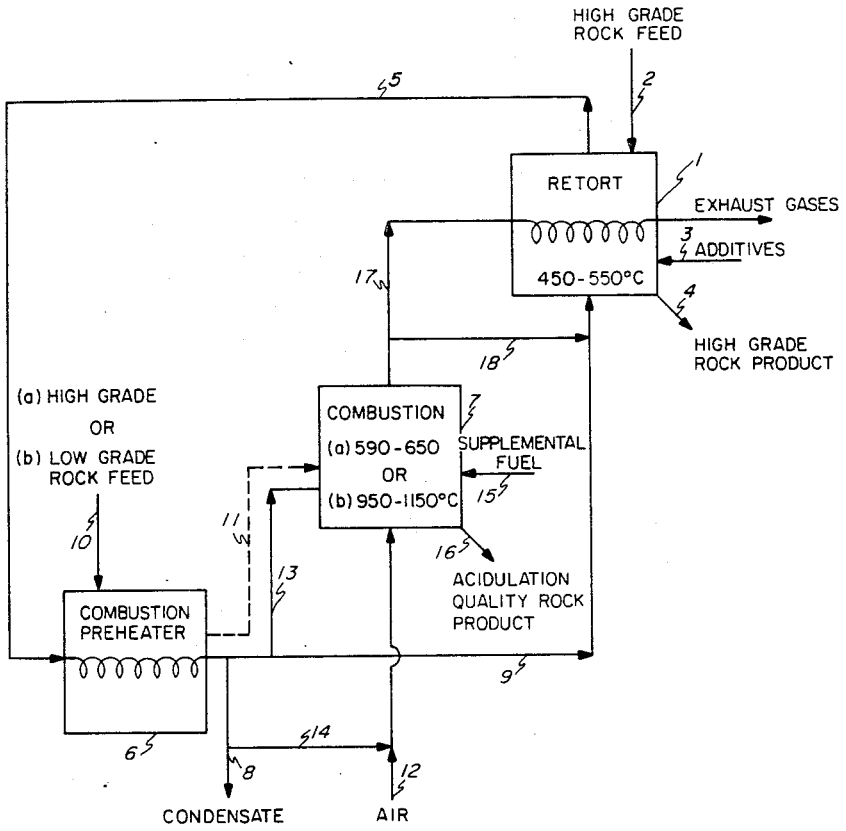

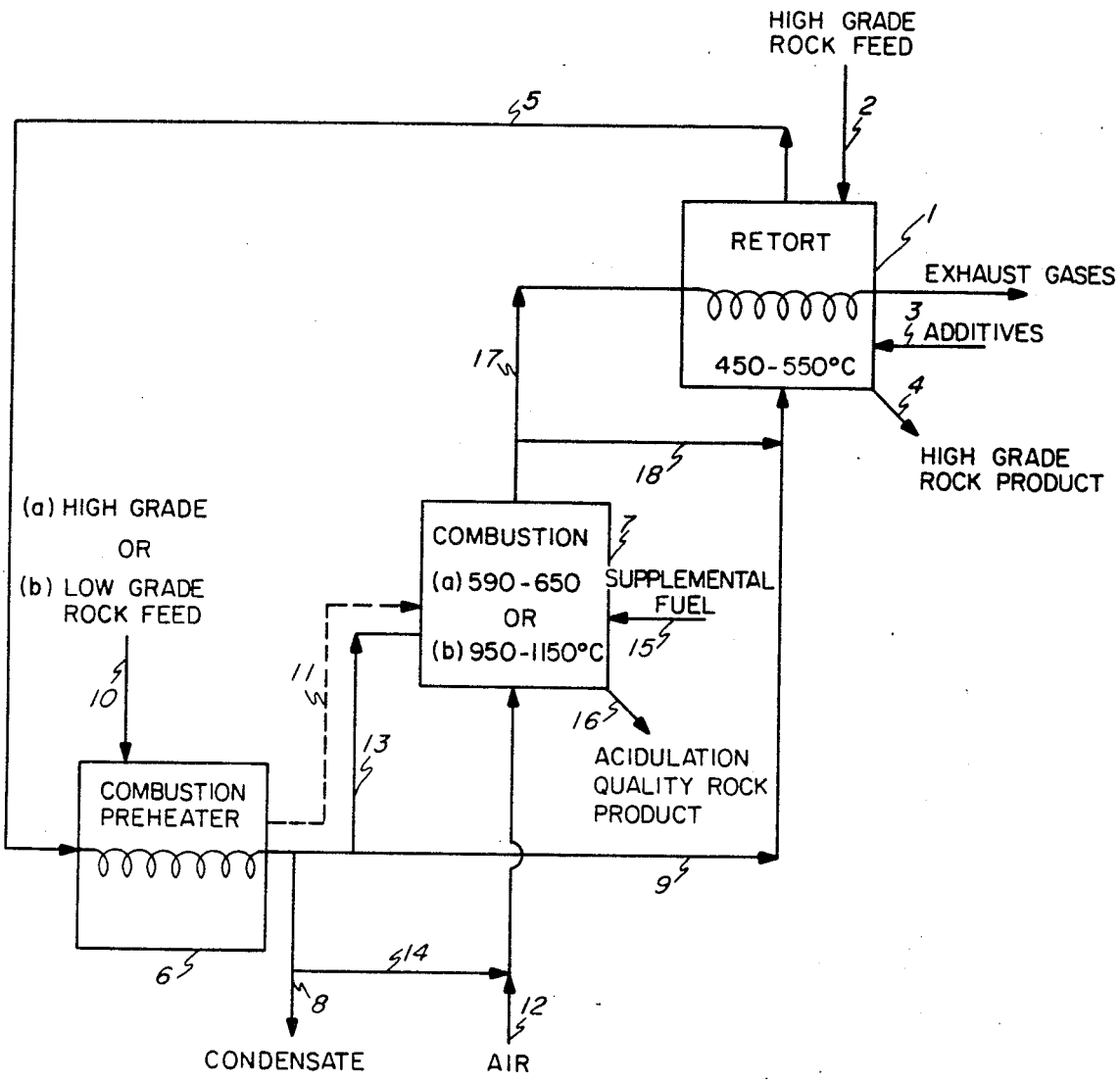
HIGH GRADE
ROCK FEED
2
5
RETORT
1
EXHAUST GASES
3
ADDITIVES
450-550°C
4
HIGH GRADE
ROCK PRODUCT
17
18
(a) HIGH GRADE
OR
(b) LOW GRADE
ROCK FEED
COMBUSTION
(a) 590-650
OR
(b) 950-1150°C
7
SUPPLEMENTAL
FUEL
15
10
11
13
16
ACIDULATION
QUALITY ROCK
PRODUCT
COMBUSTION
PREHEATER
9
6
14
8
12
CONDENSATE
AIR